United States Patent Office 2,900,376
Patented Aug. 18, 1959

2,900,376

HYDROLYSIS OF PHOSPHORUS SULFIDE-HYDROCARBON REACTION PRODUCT

Albert R. Sabol, Munster, and Randel Q. Little, Jr., Hammond, Ind., assignors to Standard Oil Company, Chicago, Ill., a corporation of Indiana No Drawing. Application October 31, 1955
Serial No. 544,058

6 Claims. (Cl. 260—139)

This invention relates to improvements in hydrolyzing the reaction products of a phosphorus sulfide and a hydrocarbon, and more particularly is directed to hydrolysis of a phosphorus sulfide-olefin polymer reaction product with a water solution of a hydroxy compound.

The reaction of a phosphorus sulfide and a hydrocarbon, and the neutralization of such reaction products, to prepare compositions useful as lubricating oil additives has been practiced extensively. U.S. patents relating thereto are U.S. 2,315,529 issued to Charles D. Kelso on April 6, 1943 and U.S. 2,316,080, 2,316,082 and 2,316,088 issued to Clarence M. Loane, et al. on April 6, 1943. It is also customary to hydrolyze the aforesaid reaction products to decrease the sulfur content and to improve the odor, cf., U.S. 2,316,084 issued to Clarence M. Loane, et al. on April 6, 1943. While in general no difficulty is encountered in hydrolyzing the reaction product of a phosphorus sulfide and a hydrocarbon as described in the prior art, we have found that lowering the temperature during such hydrolysis inhibits the formation of polyphosphoric acids, polysulfides, inorganic acids and the like, and appreciably decreases the cost of the process. However, in the presence of water, alcohol, or the like, as taught by the prior art, hydrolysis is not complete at temperatures lower than about 300° F. and an additional difficulty encountered when alcohol is employed is the excessive formation of mercaptans in the hydrolyzed product.

It is an object of this invention to provide an improved method of hydrolyzing phosphorus sulfide-hydrocarbon reaction products at a lower temperature than has heretofore been provided. It is a further object to provide a method of hydrolyzing phosphorus sulfide-hydrocarbon reaction products whereby the formation of undesirable byproducts such as mercaptans, polysulfides, polyphosphoric acids, inorganic acids, and the like are minimized. Another object is to provide an improved method of hydrolyzing phosphorus sulfide-hydrocarbon reaction products whereby after neutralization with a basic metal compound, they may be more readily filtered than the prior art neutralized products.

We have discovered that the foregoing objects can be attained by hydrolyzing a phosphorus sulfide-hydrocarbon reaction product at a temperature of from about 150° F. to about 220° F., and preferably at the reflux temperature of the reaction mixture, for a time of from about 1 to about 10 hours, and preferably for about 3 hours, with from about 10% to about 95% or more by weight of a mixture consisting of water and from about 5% to about 90% by weight of a water soluble hydroxy compound selected from the group consisting of alkanols, aryl substituted alkanols, phenol, substituted phenols, and mixtures thereof. Examples of these are such as isopropyl alcohol, benzyl alcohol, methyl phenol, and the like.

In the patents referred to hereinbefore, there is described the preparation of the products obtained by reacting a phosphorus sulfide, preferably $P_2S_5$, with a hydrocarbon, particularly with a polymer of an olefinic hydrocarbon.

The hydrocarbon reactant of this reaction is described in detail in the aforesaid patents. Briefly, the hydrocarbon reactant is preferably a mono-olefin hydrocarbon polymer resulting from the polymerization of low molecular weight mono-olefinic hydrocarbons or isomono-olefinic hydrocarbons, such as propylenes, butylenes and amylenes, or the co-polymers obtained by the polymerization of hydrocarbon mixtures containing iso-mono-olefins and mono-olefins of less than 6 carbon atoms. The polymers may be obtained by the polymerization of these olefins or mixtures of olefins in the presence of a catalyst such as sulfuric acid, phosphoric acid, boron fluoride, aluminum chloride or other similar halide catalysts of the Friedel-Crafts type.

A suitable polymer for the reaction with phosphorus sulfide is the product obtained by polymerizing in the liquid phase a hydrocarbon mixture containing butylenes and isobutylenes together with butanes and some $C_3$ and $C_5$ hydrocarbons at a temperature between about 0° F. and 30° F., in the presence of aluminum chloride. A suitable method for carrying out the polymerization is to introduce the aluminum chloride into the reactor and introduce the hydrocarbon mixture cooled to a temperature of about 0° F. into the bottom of the reactor and pass it upwardly through the catalyst layer while regulating the temperature within the reactor so that the polymer product leaving the top of the reactor is at a temperature of about 30° F. After separating the polymer from the catalyst sludge and unreacted hydrocarbons, the polymer is fractionated to obtain a fraction of the desired viscosity, such as for example, from about 80 seconds to about 2000 seconds Saybolt Universal at 210° F.

Essentially paraffinic hydrocarbons such as bright stock residuums, lubricating oil distillates, petrolatums, or paraffin waxes, may be used. There can also be employed the condensation products of any of the foregoing hydrocarbons, usually through first halogenating the hydrocarbons, with aromatic hydrocarbons in the presence of anhydrous inorganic halides, such as aluminum chloride, zinc chloride, boron fluoride, and the like.

Other preferred olefins suitable for the preparation of the hereindescribed phosphorus sulfide reaction products are olefins having at least 20 carbon atoms in the molecule of which from about 13 carbon atoms to about 18 carbon atoms, and preferably at least 15 carbon atoms, are in a long chain. Such olefins can be obtained by the dehydrogenation of paraffins, such as by the cracking of paraffin waxes or by the dehalogenation of alkyl halides, preferably long chain alkyl halides, and particularly halogenated paraffin waxes.

Also contemplated within the scope of the present invention are the reaction products of a phosphorus sulfide with an aromatic hydrocarbon, such as for example, benzene, naphthalene, toluene, xylene, diphenyl and the like or with an alkylated aromatic hydrocarbon, such as for example, benzene having an alkyl substituent having at least four carbon atoms, and preferably at least eight carbon atoms, such as long chain paraffin wax.

In general, the preparation of a phosphorus sulfide-hydrocarbon reaction product in accordance with the present invention is carried out in the following manner:

The hydrocarbon, such as, for example, an olefinic polymer of the desired molecular weight, is reacted with from about 1% to about 50%, and preferably from about 5% to about 25% of a phosphorus sulfide, such as $P_2S_3$, $P_4S_7$, $P_4S_3$, etc. and preferably phosphorus penta-sulfide, at a temperature of from about 200° F. to about 600° F. in a non-oxidizing atmosphere, such as, for example, an atmosphere of nitrogen, the reaction is carried out for from about 1 to about 10 hours or more, and preferably for about 5 hours. The phosphorus sulfide-hydrocarbon reaction can, if desired, be carried out in the presence of a sulfurizing agent as described in U.S. 2,316,087, issued to Gaynor et al. on April 6, 1943.

In accordance with the present invention, the phosphorus sulfide-hydrocarbon reaction product, prepared as described above, is hydrolyzed with from about 10% to about 95% or more by weight of a mixture consisting of water and from about 5% to about 90% of a water soluble hydroxy compound such as methyl, ethyl, propyl, isopropyl, or butyl alcohol; phenol and its derivatives such as, for example, cresol or mixtures of cresols, and aryl substituted alkanols such as, for example, benzyl alcohol and the like. It is contemplated that essentially any alcohol may be used having solubility characteristics such that at least about 5% by weight of the alcohol may be maintained in the water-alcohol mixture at reaction temperature. If less than about 5% alcohol is used in the mixture, the reaction will be incomplete and the product will contain an excessive amount of loosely bound sulfur and/or sulfur compounds which have a characteristic strong odor which is undesirable; if more than about 90% alcohol is used in the mixture, mercaptan compounds are formed which also have a very characteristic and strong odor which is undesirable. These mercaptans also interfere with the subsequent neutralization of the reaction product if such is desired.

The hydrolysis reaction is carried out at a temperature of from about 150° F. to about 220° F., and preferably at the reflux temperature of the reaction mixture. At temperatures lower than about 150° F., the rate of reaction is so low as to be uneconomical, and at temperatures above about 220° F. the disadvantages inherent in the prior art methods become appreciable, i.e., polyphosphoric acids are formed, substantial amounts of inorganic acids and anhydrides are formed and the degradation of high molecular weight organic acids sets in.

To demonstrate the effectiveness of hydrolyzing the reaction product of a phosphorus sulfide and a hydrocarbon in accordance with the present invention, compositions were prepared as follows:

Example I 2000 grams of the reaction product of $P_2S_5$ and an isobutylene polymer of about 1000 molecular weight, prepared by heating about 15% $P_2S_5$ with the polymer at a temperature of about 300° F. for about 5 hours, was diluted with an SAE solvent extracted 5W lubricating oil to a phosphorus content of 1.98%. Hydrolysis was effected with 700 grams (35% by weight) of a mixture of 50% water and 50% isopropanol, by weight, at the reflux temperature of the mixture (about 190° F.) for five hours. The alcohol-water mixture was then allowed to separate and the hydrolyzed product was removed. The acidity of this product was equivalent to 25 mg. KOH per gram of product, however, less than 2% of the phosphorus was present in the form of phosphoric acid.

Example II

A run similar to that described in Example I was made, using benzyl alcohol in place of isopropanol. The hydrolyzed product obtained was substantially identical to that obtained in Example I.

Example III

A run similar to that described in Example I was made in which the hydrolysis was carried out in the presence of about 10% by weight of water, i.e., alcohol was omitted. The mixture was hydrolyzed at reflux temperature (about 212° F.) for about 8 hours. A stable emulsion was formed and the product was not analyzed.

Example IV

A run similar to that described in Example I was made in which the water was omitted. Thus the hydrolysis was carried out in the presence of about 18% by weight of isopropanol at the reflux temperature (about 180° F.) for a period of time of about 5 hours. The formation of excessive mercaptan compounds was obvious and the product was not analyzed.

Example V

A portion of the oil diluted $P_2S_5$-isobutylene polymer of Example I was hydrolyzed in the presence of steam at a temperature of about 300° F. for a period of time of about 5 hours. This is in accordance with the prior art methods. The hydrolyzed product obtained in this manner had an acidity equivalent to about 25 mg. KOH per gram of product, however more than 10% of the phosphorus in the product was present in the form of phosphoric acid which had to be removed by contacting the product with fuller's earth. This, of course, reduced the overall yield and also removed substantial amounts of low molecular weight phosphorus containing hydrocarbons.

The above examples demonstrate the effectiveness of hydrolyzing the reaction product of a phosphorus sulfide and a hydrocarbon in accordance with our invention. As indicated in Examples I and II, the acidity of the hydrolyzed product is about 25 mg. KOH per gram with less than 2% of the phosphorus present in the form of phosphoric acid. In Example V, which is typical of the prior art methods of hydrolyzing $P_2S_5$ hydrocarbon reaction products, it is demonstrated that although the acidity of the product obtained is substantially equivalent to that obtained using our method, more than 10% of the phosphorus is present in the form of phosphoric acid which had to be removed by clay treating. The clay treating step reduces the yield of the final product. Examples III and IV demonstrate that using alcohol or water alone at the reaction conditions of our invention results in a product which cannot be economically processed further.

To further demonstrate the advantage of hydrolyzing phoshporus sulfide-hydrocarbon reaction products in accordance with our invention, the products of Example I and V were neutralized with about 5% by weight of barium oxide by agitating at about 300° F. in the presence of excess steam for about four hours, then heating to 400° F. while blanketing the reaction mixture with a non-oxidizing atmosphere of nitrogen. The resulting product was filtered. The filter rate of the neutralized reaction product of Example I was almost three times as great as that obtained with the neutralized product of Example V. This increase in filter rate has a substantial economic benefit inasmuch as it has generally been found necessary to filter the neutralized reaction products of a phosphorus sulfide and a hydrocarbon to remove undesirable compounds. Increasing filter rates substantially lowers the cost of preparing such a neutralized compound.

The reaction products made in accordance with our invention are useful per se as additives in lubricant compositions used for the lubrication of internal combustion engines or as intermediates in the preparation of neutralized lubricant additives as indicated in the examples and described in detail in U.S. 2,316,080 and 2,316,082.

Percentages given herein and in the appended claims are weight percentages unless otherwise noted.

While we have described our invention by reference to specific embodiments thereof, the same are given by way of illustration only. Modifications and variations will be apparent from our description to those skilled in the art.

We claim:

1. In the preparation of the reaction product of a phosphorus sulfide and a hydrocarbon in which the hydrocarbon is reacted with from about 1% to about 50% of a phosphorus sulfide at a temperature of from about 200° F. to about 600° F., the improvement comprising hydrolyzing the phosphorus sulfide-hydrocarbon reaction product at a temperature of from about 150° F. to about 220° F. for a period of time from about 1 to about 10 hours with at least about 10% by weight of a mixture consisting of water and from about 5% to about 90% by weight of a water soluble hydroxy compound selected from the group consisting of lower alkanols, phenyl substituted lower alkanols, phenol, alkyl substituted phenols, and mixtures thereof.

2. The method of hydrolyzing the reaction product of a phosphorus sulfide and a hydrocarbon, in which the hydrocarbon is reacted with from about 1% to about 50% of a phosphorus sulfide at a temperature of from about 200° F. to about 600° F., which method comprises heating said phosphorus sulfide-hydrocarbon reaction product at a temperature of from about 150° F. to about 220° F. for a period of time of from about 1 to about 10 hours in the presence of from about 10% to about 95% by weight of a mixture consisting of water and from about 5% to about 90% of a water soluble hydroxy compound selected from the group consisting of lower alkanols, phenyl substituted lower alkanols, phenol, substituted phenols, alkyl and mixtures thereof.

3. The method of hydrolyzing the reaction product of a phosphorus sulfide and a hydrocarbon, in which the hydrocarbon is reacted with from about 1% to about 50% of a phosphorus sulfide at a temperature of from about 200° F. to about 600° F., which method comprises diluting said phosphorus sulfide-hydrocarbon reaction product with a normally liquid hydrocarbon to a phosphorus content of from about 1.5 to about 5%, heating said diluent phosphorus sulfide-hydrocarbon reaction product at a temperature of from about 150° F. to about 220° F. for a period of time of from about 1 to about 10 hours in the presence of from about 10% to about 95% by weight of a mixture consisting of water and from about 5% to about 90% of a water soluble hydroxy compound selected from the group consisting of lower alkanols, phenyl substituted lower alkanols, phenol, alkyl substituted phenols, and mixtures thereof.

4. The method of claim 3 wherein said phosphorus sulfide hydrocarbon reaction product is the reaction product of $P_2S_5$ and a butylene polymer having a molecular weight of from about 500 to about 50,000.

5. The method of claim 3 wherein said water soluble hydroxy compound is isopropanol.

6. The method of claim 3 wherein the hydrolysis is carried out at the reflux temperature of the reaction mixture.

References Cited in the file of this patent
UNITED STATES PATENTS

| | | |
|---|---|---|
| 2,356,073 | May | Aug. 15, 1944 |
| 2,566,398 | Bartlelson et al. | Sept. 4, 1951 |

OTHER REFERENCES

Synthetic Organic Chemicals, 12th edition (1945), pp. 9 and 10, published by Carbide & Carbon Chemicals Corp.